US009904922B2

(12) United States Patent
Blainey et al.

(10) Patent No.: US 9,904,922 B2
(45) Date of Patent: *Feb. 27, 2018

(54) EFFICIENT TAIL CALCULATION TO EXPLOIT DATA CORRELATION (71) Applicant: International Business Machines Corporation, Armonk, NY (US)

(72) Inventors: Robert J. Blainey, Newmarket (CA); Barnaby Dalton, Mississauga (CA); Louis Ly, Richmond Hills (CA); James A Sedgwick, Toronto (CA); Lior Velichover, Vaughan (CA); Kai-Ting A. Wang, North York (CA)

(73) Assignee: International Business Machines Corporation, Armonk, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/057,797

(22) Filed: Mar. 1, 2016

(65) Prior Publication Data

US 2016/0253674 A1 Sep. 1, 2016

Related U.S. Application Data (63) Continuation of application No. 14/634,285, filed on Feb. 27, 2015.

(51) Int. Cl.
*G06F 17/15* (2006.01)
*G06Q 20/40* (2012.01)
*G06F 17/18* (2006.01)

(52) U.S. Cl.
CPC ......... *G06Q 20/4016* (2013.01); *G06F 17/18* (2013.01)

(58) Field of Classification Search
CPC ............................ G06Q 20/4016; G06F 17/18
USPC ............................................ 708/422; 705/35
See application file for complete search history.

(56) References Cited

U.S. PATENT DOCUMENTS

| 8,095,491 B1 | 1/2012 | Dillon | |
|---|---|---|---|
| 2006/0242217 A1* | 10/2006 | Bartels | .................... G06F 17/18 708/270 |
| 2016/0253672 A1* | 9/2016 | Hunter | ............... G06Q 20/4016 705/39 |

(Continued)

OTHER PUBLICATIONS

Manevich et al., "Heap Decomposition for Concurrent Shape Analysis," Tel Aviv University, School of Computer Science, Technical Report TR-2007-11-85453, Nov. 2007, 23 pp.

(Continued)

*Primary Examiner* — Tan V. Mai
(74) *Attorney, Agent, or Firm* — Shumaker & Sieffert P.A.

(57) ABSTRACT

A computing system includes at least one processor and at least one module operable by the at least one processor to calculate a tail of a first dataset by determining elements of the first dataset that fall outside of a specified percentile, and determine locations of the first dataset at which elements of the first dataset that fall outside of the specified percentile are located. The at least one module may be operable to calculate a tail of a second dataset by populating a data structure with elements of the second dataset that correspond to the locations of the first dataset, and determining, using the data structure, elements of the second dataset that fall outside of the specified percentile. The at least one module may be operable to output an indication of at least one of the tail of the first dataset or the tail of the second dataset.

8 Claims, 4 Drawing Sheets

(56) References Cited

U.S. PATENT DOCUMENTS

2017/0068761 A1* 3/2017 Luquist .................. G06F 17/18

OTHER PUBLICATIONS

Press et al., "Section 8.5 Selecting the Mth Largest," Numerical Recipes, The Art of Scientific Computing, 3rd Edition, Cambridge University Press, Sep. 2007, 17 pp.
Dembo et al., "Mark to Future, A framework for measuring risk and reward," Business Analytics, Algorithmics Publications, IBM, May 2000, 105 pp.
Furtak et al., "Using SIMD Registers and Instructions to Enable Instruction-Level Parallelism in Sorting Algorithms," Proceedings of the 19th Annual ACM Symposium on Parallel Algorithms and Architectures, SPAA '07, Jun. 9-11, 2007, 10 pp.
"k largest(or smallest) elements in an array | added Min Heap method," GeeksforGeeks, retrieved from http://www.geeksforgeeks.org/k-largestor-smallest-elements-in-an-array/ on Feb. 27, 2015, 17 pp.
U.S. Appl. No. 14/634,285, filed Feb. 27, 2015 by Robert J. Blainey et al.
Office Action from U.S. Appl. No. 14/634,285, dated Jul. 3, 2017, 7 pp.
Amendment in Response to Office Action dated Jul. 3, 2017, from U.S. Appl. No. 14/634,285, filed Sep. 21, 2017, 10 pp.
Notice of Allowance from U.S. Appl. No. 14/634,285, dated Oct. 6, 2017, 9 pgs.

* cited by examiner

EFFICIENT TAIL CALCULATION TO EXPLOIT DATA CORRELATION

This application is a Continuation of application Ser. No. 14/634,285, filed Feb. 27, 2015, the entire content of which is hereby incorporated by reference.

BACKGROUND

Risk is an important consideration in a number of business areas, such as finance, banking, and others. Various ways of quantifying risk (e.g., risk measures) may be used, including the value at risk measure (VaR) and the Conditional Value at Risk measure (CVA or CVaR). Calculating VaR or CVA may include performing left and/or right tail non-parametric functions (e.g., "tail calculations").

Often, risk may be used in real-time reporting and/or limit checking. Thus, efficiency and performance when calculating risk measures may be of particular importance. When working with large datasets and/or calculating numerous risk measures, conventional methods of performing tail calculations may impose substantial computational cost on the overall computation of risk measures. For instance, some computational methods of calculating risk measures may spend approximately 20% or more of the overall time on tail-related computations.

SUMMARY

The techniques of the present disclosure may exploit data correlation between two or more datasets to achieve improved performance of tail calculations for correlated datasets.

In one example a method includes calculating, by a computing device, a tail of a first dataset, wherein calculating the tail of the first dataset includes determining elements of the first dataset that fall outside of a specified percentile, and determining, by the computing device, locations of the first dataset at which the elements of the first dataset that fall outside of the specified percentile are located. The method may further include calculating, by the computing device, a tail of a second dataset, wherein calculating the tail of the second dataset includes: populating a data structure with elements of the second dataset that are located at locations of the second dataset that correspond to the locations of the first dataset, and determining, using the data structure, elements of the second dataset that fall outside of the specified percentile, and outputting, by the computing device, an indication of at least one of the tail of the first dataset or the tail of the second dataset.

In another example a computing system includes at least one processor and at least one module operable by the at least one processor to: calculate a tail of a first dataset, wherein calculating the tail of the first dataset includes determining elements of the first dataset that fall outside of a specified percentile, and determine locations of the first dataset at which the elements of the first dataset that fall outside of the specified percentile are located. The at least one module may be further operable by the at least one processor to calculate a tail of a second dataset, wherein calculating the tail of the second dataset includes: populating a data structure with elements of the second dataset that are located at locations of the second dataset that correspond to the locations of the first dataset, and determining, using the data structure, elements of the second dataset that fall outside of the specified percentile, and output an indication of at least one of the tail of the first dataset or the tail of the second dataset.

In another example a computer program product includes a computer readable storage medium having stored thereon: program instructions executable by at least one processor to cause at least one computing device to calculate a tail of a first dataset, wherein calculating the tail of the first dataset includes determining elements of the first dataset that fall outside of a specified percentile and program instructions executable by the at least one processor to cause the at least one computing device to determine locations of the first dataset at which the elements of the first dataset that fall outside of the specified percentile are located. The computer readable storage medium may have further stored thereon program instructions executable by the at least one processor to cause the at least one computing device to calculate a tail of a second dataset, wherein calculating the tail of the second dataset includes: populating a data structure with elements of the second dataset that are located at locations of the second dataset that correspond to the locations of the first dataset, and determining, using the data structure, elements of the second dataset that fall outside of the specified percentile, and program instructions executable by the at least one processor to cause the at least one computing device to output an indication of at least one of the tail of the first dataset or the tail of the second dataset.

The details of one or more examples are set forth in the accompanying drawings and the description below. Other features, objects, and advantages will be apparent from the description and drawings, and from the claims.

DETAILED DESCRIPTION

The techniques of the present disclosure enable a computing device to provide the results of tail calculations for correlated data sets in a potentially faster and more efficient manner. A tail calculation, generally, may be used to determine an element (e.g., a value) from among a plurality of elements that represents a given percentile of the plurality of elements. That is, performing a tail calculation on a dataset using a given threshold (e.g., a percentile, k) may involve determining an element, x, of the dataset, such that k percent of the elements in the dataset are bigger (or smaller) than x. In some examples, x may be referred do as a "pivot element." As one example, in the plurality of elements, [1, 2, 3, 4, 5, 6, 7, 8, 9, 10], performing a tail calculation given a specified percentile of 20 may yield 3, because 20 percent of the values (e.g., 1 and 2) are less than or equal to 3. In some examples, tail calculations may involve additional operations, such as computing some unordered reduction of the elements larger and/or smaller than the pivot element. For instance, various tail calculations may involve computing the sum of the elements, a count of the elements, an average (e.g., a mean) of the elements, or other computations. For ease of explanation purposes only, a tail calculation is described herein as determining the pivot element. However, the techniques of the present disclosure may also be applied to various other tail calculations.

By using the techniques described herein, computing devices may increase the speed of tail calculations and thus allow users to make more accurate decisions using more up-to-date information. For instance, the techniques of the present disclosure may allow financial analysts and traders to more quickly determine risk associated with financial obligations or financial transactions, such as a potential trade. As another example, the techniques of the present disclosure may enable biologists or medical researchers to more quickly analyze large datasets. In other words, the techniques described herein may be used in various situations in which tail calculations or other heap-based determinations need to be performed on a plurality of correlated datasets.

Figure 1:
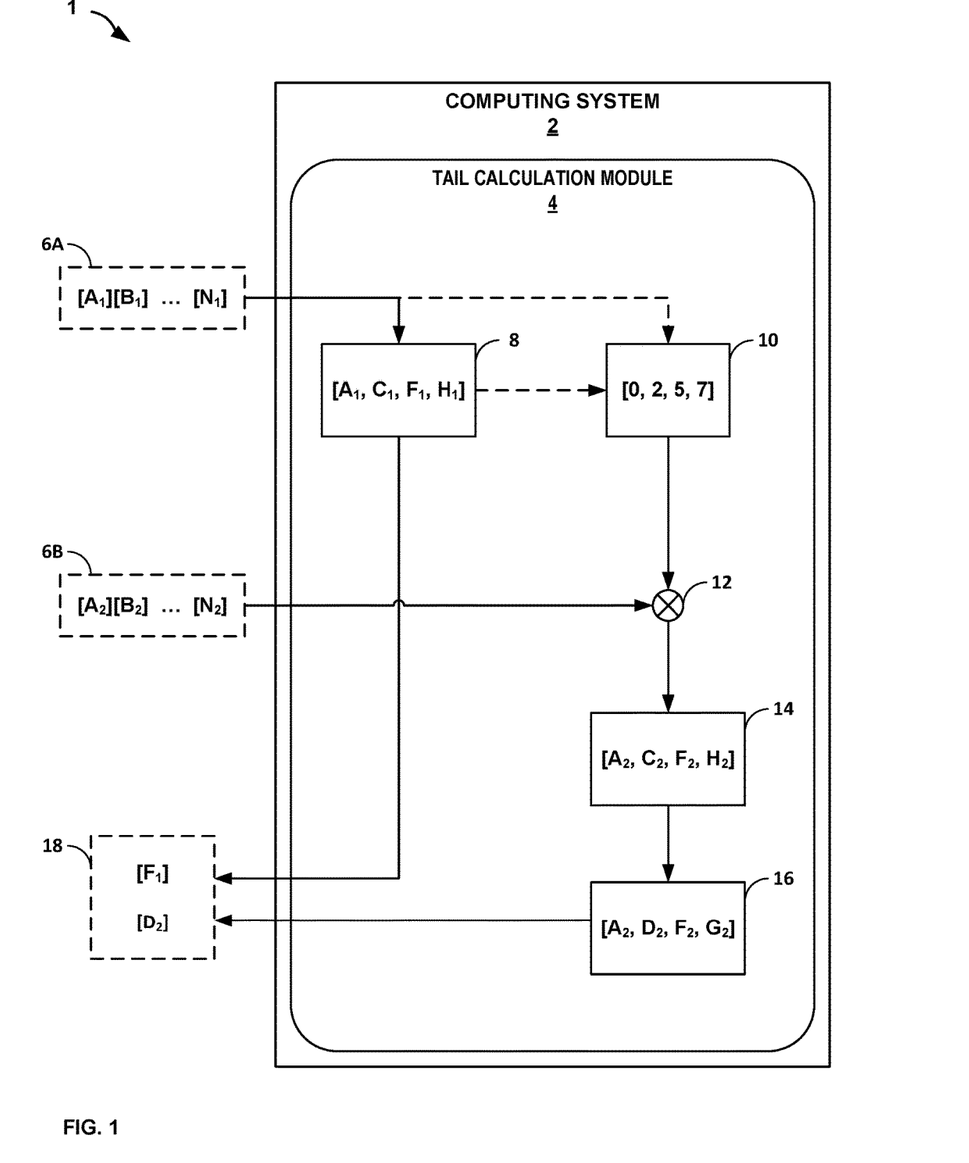
FIG. 1 is a conceptual diagram illustrating an example computing environment in which a computing system is configured to perform efficient tail calculations in accordance with one or more techniques of the present disclosure.

FIG. 1 is a conceptual diagram illustrating an example computing environment 1 in which a computing system 2 is configured to perform efficient tail calculations in accordance with one or more techniques of the present disclosure. Examples of computing system 2 may include, but are not limited to, portable, mobile, or other devices, such as mobile phones, laptop computers, desktop computers, tablet computers, personal digital assistants (PDAs), server computers, mainframes, cloud computing systems, and the like. For instance, in the example of FIG. 1, computing system 2 may be a desktop computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the example of FIG. 1, computing system 2 includes tail calculation module 4. Tail calculation module 4 may represent a collection of hardware, firmware, and/or software that is operable by computing system 2 to perform tail calculations on one or more correlated datasets, such as dataset 6A and dataset 6B (collectively, "datasets 6"). Datasets sets 6 may be correlated in that the values of one dataset may be dependent on or otherwise related to respective values of another dataset. For instance, in the example of FIG. 1, values $A_2, B_2, \ldots,$ and $N_2$ of dataset 6B may be related to values $A_1, B_1, \ldots,$ and $N_1$ of dataset 6A, respectively. As one example of a correlation between two datasets, the values of datasets 6 may represent the values of time-dependent variables at two consecutive points in time. That is, $A_1$ may represent the value of variable A at time T and $A_2$ may represent the value of A at time T+1. Similarly, $B_2$ may represent the value of variable B at time T and $B_2$ may represent the value of B at time T+1. The values of dataset 6B may be correlated with respective values of dataset 6A in that if a value of dataset 6A increases, there is a non-zero, positive likelihood that the corresponding value of dataset 6B will also increase. Examples of correlated datasets include a collection of stock prices over time, a collection of measurements in biological samples over time, a collection of values representing continuous functions, and others.

Tail calculation module 4, in the example of FIG. 1, may be operable by computing system 2 to perform a tail calculation on dataset 6A to determine a value of dataset 6A that represents a percentile value for a specified percentile, k, of dataset 6A. For instance, tail calculation module 4 may determine a value of dataset 6A that represents the $95^{th}$ percentile of dataset 6A, a value that represents the $99^{th}$ percentile of dataset 6A, or other value representing another percentile.

As part of calculating the tail of dataset 6A, tail calculation module 4 may determine set 8, representing the elements from dataset 6A that fall outside of the specified percentile. For instance, in one implementation, tail calculation module 4 may perform the nth_element routine from the C++ standard library. The nth_element routine is a partial sorting algorithm that rearranges elements in a set such that the nth element of the set becomes the element that would occur in that position if the set were sorted, and all the elements before the nth element are less than or equal to the nth element. That is, the nth_element routine can be used to identify the kth largest/smallest element in a dataset (e.g., an array). The nth_element routine, in turn, uses the quick select algorithm. The quick select algorithm uses the same overall approach as the quick sort algorithm—choosing one element of the dataset as a pivot and then partitioning the other elements in to two groups based on whether each element is less than or greater than the pivot. However, instead of recursing into both sides, as the quick sort algorithm does, the quick select algorithm recurses into only one side—the side containing the desired tail. As another example of determining set 8, tail calculation module 4 may employ a heap-based algorithm (e.g. min-heap) to determine the elements of dataset 6A that fall outside of the specified percentile.

In the example of FIG. 1, tail calculation module 4 may be operable by computing system 2 to determine locations 10. Locations 10 may be a set of values representing locations (e.g., indices) of dataset 6A at which the elements of the first dataset that fall outside of the specified percentile are located. That is, locations 10 indicate where in dataset 6A each element in set 8 is located. In other words, locations 10 indicate locations of dataset 6A at which elements that fall outside of the specified percentile can be found. In some examples, tail calculation module 4 may determine locations 10 from set 8. In some examples, tail calculation module 10 may determine locations 10 and set 8 concurrently. For instance, when calculating set 8, if an element of dataset 6A is included in set 8, the corresponding location of the element may be included in locations 10.

Tail calculation module 4, in the example of FIG. 1, may be operable by computing system 2 to perform a tail calculation on dataset 6B to determine a value of dataset 6B that represents a percentile value given the specified percentile. In various examples, tail calculation module 4 may be operable to perform various other types of tail calculations (e.g., a sum of all elements less than the specified percentile, etc.). That is, tail calculation module 4 may calculate the tail of a second dataset (e.g., dataset 6B), the second dataset having values that are correlated with values of the first dataset (dataset 6A). In calculating the tail of dataset 6B, tail calculation module 4 may, in accordance with the techniques described herein, leverage the fact that datasets 6 are correlated. For instance, tail calculation module 4 may perform operation 12. Operation 12 may provide, based on locations 10, a preliminary set of elements (set 14) from dataset 6B that are more likely to fall outside of the specified percentile. That is, because each element of dataset 6B is correlated with a respective element of dataset 6A, if a location within dataset 6A (e.g., specified by locations 10) holds an element that falls outside of the specified percentile for dataset 6A (e.g., specified by set 8), that same location within dataset 6B holds an element that is more likely to fall outside of the specified percentile for dataset 6B. Thus, instead of performing operations on dataset 6B that are the same as the operations performed on dataset 6A, tail calculation module 4 may perform different operations to more efficiently calculate the tail of dataset 6B.

As a result of performing operation 12, tail calculation module 4 may populate set 14 with elements of the dataset 6B that are located at locations of dataset 6B that correspond to the locations of dataset 6A as specified in locations 10. That is, tail calculation module 4 may include, in a data structure, elements of dataset 6B that are at the locations specified by locations 10. As a result, elements in set 14 may have a higher likelihood of falling outside the specified percentile because the elements of dataset 6B are correlated with the elements of dataset 6A.

In the example of FIG. 1, tail calculation module 4 may be operable by computing system 2 to use set 14 to determine the elements of dataset 6B that fall outside of the specified percentile and output an indication of at least one of the tail of the first dataset or the tail of the second dataset. By exploiting the correlation between datasets 6, tail calculation module 4 may enable computing system 2 to more quickly and efficiently determine tails of the datasets by determining locations of dataset 6A that correspond to elements of dataset 6A that fall outside of the specified percentile and using those determined locations to predict which elements of dataset 6B will likely fall outside of the specified percentile.

Figure 2:
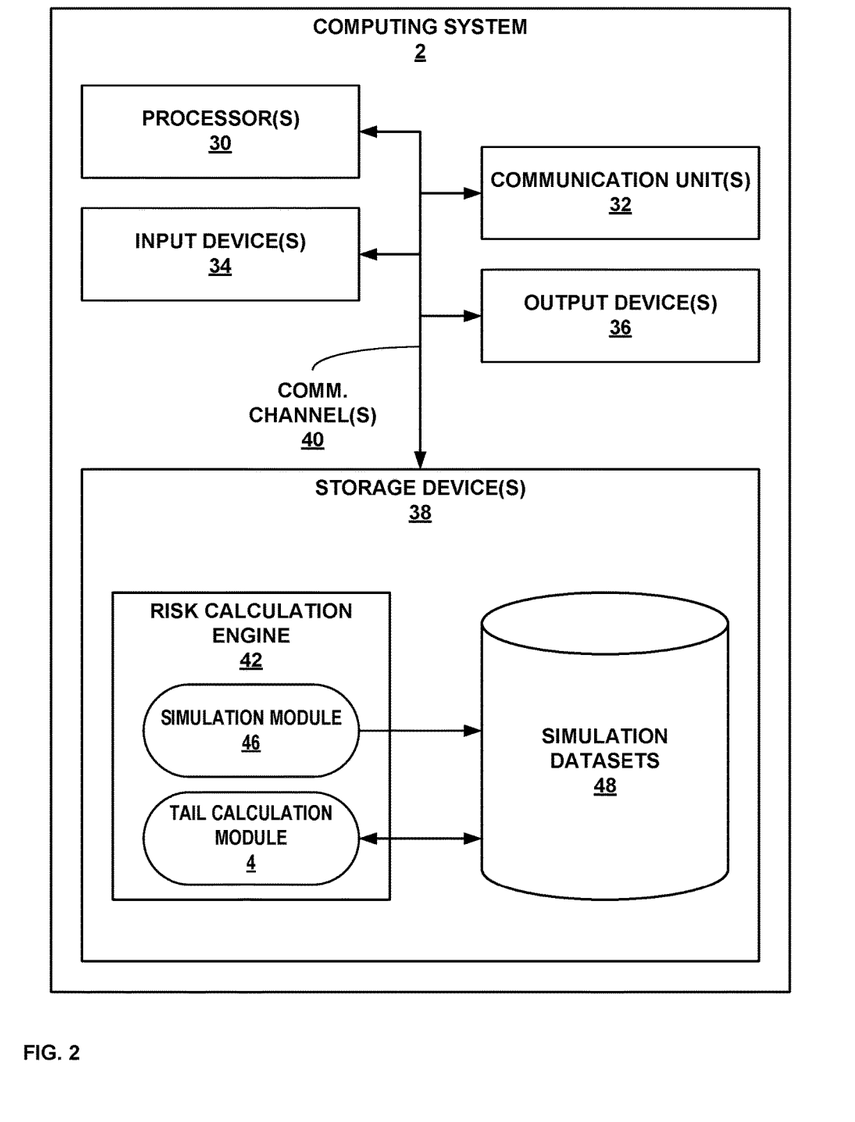
FIG. 2 is a block diagram illustrating one example of a computing system configured to perform efficient tail calculations in accordance with one or more techniques of the present disclosure.

FIG. 2 is a block diagram illustrating one example of a computing system 2 configured to perform efficient tail calculations in accordance with one or more techniques of the present disclosure. The example of FIG. 2 is described below within the context of FIG. 1. FIG. 2 illustrates only one particular example of computing system 2, and many other examples of computing system 2 may be used in other instances. In some examples, computing system 2 may include fewer components than shown in the example of FIG. 2 or additional or different components not shown in the example of FIG. 2.

As shown in the example of FIG. 2, computing system 2 includes one or more processors 30, one or more communications units 32, one or more input devices 34, and one or more output devices 36. Computing system 2 also includes one or more storage devices 38. Storage devices 38 include risk calculation engine 42 and simulation datasets 48. Risk calculation engine 42, in turn, includes simulation module 46 and tail calculation module 4. Communication channels (COMM. CHANNELS) 40 may interconnect components 30, 32, 34, 36, 38, 42, 46, and/or 48 for inter-component communications (physically, communicatively, and/or operatively). In some examples, communication channels 40 may include a system bus, a network connection, an inter-process communication data structure, or any other method for communicating data.

One or more communication units 32, in the example of FIG. 2, may be operable to communicate with external devices via one or more wired and/or wireless networks by transmitting and/or receiving network signals on the one or more networks. Examples of communication units 32 include a network interface card (e.g. such as an Ethernet card), an optical transceiver, a radio frequency transceiver, a GPS receiver, or any other type of device that can send and/or receive information. Other examples of communication units 32 may include Near-Field Communications (NFC) units, Bluetooth radios, short wave radios, cellular data radios, wireless network radios, as well as universal serial bus (USB) controllers, network cables, or any other means of inter-system communication.

In the example of FIG. 2, one or more input devices 34 may be operable to receive input. Examples of input are tactile, audio, and video input. Input devices 34, in one example, include a presence-sensitive or touch-sensitive display, a mouse, a keyboard, a voice responsive system, a video camera, a microphone or other audio sensor, or any other type of device for detecting input from a human or machine.

One or more output devices 36, in the example of FIG. 2, may be operable to generate output. Examples of output are tactile, audio, and video output. Output devices 36, in one example, include a presence-sensitive display, sound card, speaker, video graphics adapter card, speaker, cathode ray tube (CRT) monitor, liquid crystal display (LCD), or any other type of device for generating output to a human or to a machine.

In the example of FIG. 2, one or more storage devices 38 store program instructions for execution of risk calculation engine 42, simulation module 46, and tail calculation module 4. Storage devices 38 may additionally store information usable during operation of computing system 2. For instance, in the example of FIG. 2, computing system 2 stores simulation datasets 48, which risk calculation engine 42 (e.g., modules 4, 46) may create and/or access during execution.

In some examples, storage devices 38 represent temporary memory, meaning that a primary purpose of storage devices 38 is not long-term storage. For instance, storage devices 38 may be volatile memory, meaning that storage devices 38 may not retain stored contents if powered off. Examples of volatile memories include random access memories (RAM), dynamic random access memories (DRAM), static random access memories (SRAM), and other forms of volatile memories known in the art. Storage devices 38, in some examples, also include one or more computer-readable storage media. Storage devices 38 may be configured to store larger amounts of information than volatile memory. Storage devices 38 may further be configured for long-term storage of information. In some examples, storage devices 38 include non-volatile storage elements, meaning that storage devices 38 may maintain information through power on/power off cycles. Examples of non-volatile memories include magnetic hard discs, optical discs, floppy discs, flash memories, or forms of electrically programmable memories (EPROM) or electrically erasable and programmable (EEPROM) memories.

One or more processors 30 may, in the example of FIG. 2, implement functionality and/or execute instructions within computing system 2. For example, processors 30 may receive and execute instructions stored by storage devices 38 that implement the functionality of risk calculation engine 42 and/or modules 4, 46. These instructions, executed by processors 30, may cause computing system 2 to read, write, or otherwise interact with information stored within storage devices 38 during program execution. Processors 30 may execute instructions to cause computing system 2 to perform efficient tail calculations on correlated datasets and/or perform associated operations. That is, risk calculation engine 42 and/or modules 4, 46 may be operable by processors 30 to perform various actions or functions of computing system 2.

In the example of FIG. 2, computing system 2 may be part of a financial analysis system that simulates, analyzes, manages, recommends, and/or otherwise calculates financial risks, financial rewards, or other such information for various financial transactions or financial obligations. For example, computing system 2 may be operable to determine and provide an analysis of the risk involved in a given financial transaction. In other words, computing system 2 may address risk and return by examining possible futures, (e.g., "scenarios"), and cataloguing each future's effect on financial positions and portfolios. Computing system 2 may utilize the state space approach to uncertainty, in which a state of nature is considered a realization of uncertainty, (e.g., a possible scenario). In each state of nature, assets and portfolios are marked-to-market along the future scenario. Computing system 2 may thus analyze risk and reward by tabulating all of the financial consequences of each state of nature. Such analysis may allow for improved decision making by trading off the benefits in some scenarios against the losses in others.

In order to analyze risk and/or reward for financial transactions, computing system 2 may receive input indicating a potential financial transaction, such as contract terms, a transfer of monetary instruments, a potential stock purchase, or any other financial transaction. In the example of FIG. 2, for instance, computing system 2 may receive information via communication units 32 indicating a potential purchase of 100 units of Company A stock. In some examples, computing system 2 may receive the input via one or more of communication units 32, such as via a network connection with other computing devices (e.g., a server hosting a trading interface). In some examples, computing system 2 may receive the input via one or more of input devices 34, such as from a user, an administrator, or via another computing device.

Input received by computing system 2 may specify a number of parameters for use in analyzing the risk involved in the indicated transaction. Example parameters may include the number of simulations to run (e.g., a number of scenarios), a simulation duration (e.g., a number of timesteps or a duration of time), a timestep size (e.g., seconds, hours, days, months, years, etc.), a threshold value (e.g., a percentile) that indicates the risk level threshold, or any other parameter usable to simulate and evaluate risk. In other examples, parameter values may be previously configured and stored at computing system 2 (e.g., in storage devices 38). That is, in some examples computing system 2 may receive parameter values while in some examples computing system 2 may use previously configured parameters. In the example of FIG. 2, for instance, computing system 2 may receive or be configured with a number of scenarios parameter value of 5000, a timestep parameter value of 250, and a timestep size parameter value of one minute. Computing system 2 may also receive or be configured with a threshold of the $95^{th}$ percentile (e.g., 0.95).

Risk calculation engine 42 of computing system 2 may be operable by processors 30 to receive information from input devices 34 and/or communications units 32 and determine the risk of the provided potential financial transaction. For instance, responsive to receiving the input information, simulation module 46 of risk calculation engine 42 may generate simulation data for use in evaluating the risk. In the example of FIG. 2, simulation module 42 may use various information to simulate 5000 scenarios and generate datasets showing the value of Company A stock at each of the 250 timesteps in each of the different scenarios.

Each scenario may be simulated using the same or different information. For example, a first scenario may simulate a stock market crash. A second scenario may simulate the increase or decrease of oil prices. A third scenario may simulate a resignation of Company A's CEO. In other words, a scenario can represent a simulation of any conceivable possible future event or events. Scenarios may be simulated using algorithms, equations, or other suitable method. For instance, one scenario may be simulated as a Gaussian process in which each subsequent timestep is calculated as a random Gaussian variable of the previous timestep. Another scenario may be simulated as a negative exponential function in which the variable approaches 0 in a negative exponential fashion as the timestep increases. In some examples, the simulated scenarios or types of simulated scenarios that are used by computing system 2 may be configurable. In some examples, computing system 2 may always use the same scenarios.

Simulation module 46 may be further operable to communicate with or otherwise access simulation datasets 48 in order to store the generated simulation data. In various examples, simulation module 46 may store simulation data in any acceptable data structure, such as a 2-dimensional array of data (e.g., a "sheet"), a collection of 1-dimensional arrays, a list of key/value pairs, or any other data structure. In the example of FIG. 2, for instance, simulation datasets 48 may be stored as a 2-dimensional array with each row representing a scenario and each column representing a timestep. Thus, simulation datasets 48 may be a 5000×250 array.

Tail calculation module 4 may be operable by processors 30 to perform tail calculations on simulation data and provide the results of at least one tail calculation to one or more other components of computing system 2. For instance, tail calculation module 4 may communicate with or otherwise access simulation datasets 48 and read the simulation data stored therein. Using the simulation data and a specified threshold (e.g., received by risk calculation engine 42 from input devices 34 and/or communication units 32), tail calculation module may perform one or more of the techniques described herein to evaluate the risk of the specified potential financial transaction.

In the example of FIG. 2, tail calculation module 4 may perform tail calculations for each timestep of the 5000 scenarios in simulation datasets 48. That is, tail calculation module 4 may determine, for each timestep and from the 5000 different values corresponding to the 5000 different scenarios, the $95^{th}$ percentile value of Company A stock at the timestep. In other words, tail calculation module 4 may determine, from the 5000 values of Company A stock for the first timestep, the smallest value that is larger than 95% of the values. Tail calculation module 4 may also determine such a value from a second timestep, and a third timestep, all the way to the $250^{th}$ timestep. By providing the results of at least one of the tail calculations, tail calculation module 4 may provide an objective level of risk and/or reward involved in the potential purchase of Company A stock. That is, risk calculation engine 42 may provide a more accurate way of determining how the value of Company A stock will change in the next 250 minutes. Based on this information, users of computing system 2 and/or other computing systems may make a more educated decision on whether or not to carry out the potential transaction.

In order to perform tail calculations for each of the 250 timesteps, tail calculation module 4 may perform at least one tail calculation in a conventional manner. For instance, tail calculation module 4 may determine how many of the 5000 scenarios should fall outside the threshold by first determining how many scenarios should fall inside the threshold, and then subtracting this number from the number of scenarios (e.g., 5000−(5000*0.95)=250). Tail calculation module 4 may then create a min-heap of the first 250 values in the first timestep.

In calculating the tail for the first timestep, tail calculation module 4 may compare the root node of the min-heap (e.g., the smallest value in the heap) to each of the remaining 4750 values in the first timestep. If a value is smaller than the root of the min-heap, then tail calculation module 4 may do nothing. If the value is larger than the root of the min-heap, then tail calculation module 4 may replace the root with the larger value and re-heapify the structure. In this way, tail calculation module 4 may obtain the largest 250 values in the first timestep, with the smallest of those 250 values being the root of the heap.

In addition to maintaining the heap of values, tail calculation module 4 may also maintain a separate heap of indices. For instance, tail calculation module 4 may add indices 1-250 to a second heap, and whenever a change is made to the heap of values, tail calculation module 4 may make a corresponding change to the heap of indices. As a result, tail calculation module 4 may obtain the indices of each of the largest 250 values in the first timestep.

In accordance with the techniques described herein, tail calculation module 4 may leverage the indices obtained during the tail calculation of the first timestep to calculate the tail of at least one additional timestep. For instance, tail calculation module 4 may use the determined indices to calculate the tail of the second dataset. Instead of creating an initial heap of the first 250 values of the second timestep, tail calculation module 4 may create an initial heap using the 250 values of the second timestep that are located at the specified indices of the first timestep. Thereafter, tail calculation module 4 may compare the root node of the heap to those values of the second timestep that were not included in the initial heap for the second timestep. If the root node is larger, tail calculation module 4 may do nothing. If the root node is smaller, tail calculation module 4 may replace the root node with the value, and re-heapify the structure. As a result, tail calculation module 4 may obtain the largest 250 scenario values of the second timestep, with the smallest of those 250 values being the root node.

In some examples, tail calculation module 4 may maintain a heap of indices for the second timestep. That is, tail calculation module 4 may use the heap of indices maintained through the tail calculation for the first timestep and make corresponding changes to the heap of indices as tail calculation module 4 makes changes to the heap of values during tail calculation for the second timestep. In this way, tail calculation module 4 may use the indices from the first timestep to "bootstrap" or improve the performance of the tail calculation for the second timestep, use the indices from the second timestep to bootstrap the tail calculation for the third timestep, and so on. This may improve performance as values of a timestep may be most correlated with values of the timestep immediately prior. However, this may introduce not insignificant overhead in maintaining a heap of indices throughout each tail calculation.

In some examples, tail calculation module 4 may not continue to make corresponding changes to the heap of indices. That is, tail calculation module 4 may use the indices from the first timestep to bootstrap the tail calculation for all subsequent indices. This may reduce the amount of overhead involved in maintain a heap of indices, as the heap of indices need only be maintained through calculation of the first timestep.

In some examples, tail calculation module 4 may perform a hybrid process, whereby the heap of indices is re-created periodically. For instance, tail calculation module 4 may re-create the heap of indices every five timesteps, every ten timesteps, every 100 timesteps, or at some other frequency. The heap of indices may then be used to bootstrap the subsequent timesteps until the heap of indices is updated.

In some examples, when re-creating the heap of indices, tail calculation module 4 may use conventional means of calculating the tail for the particular timestep. That is, tail calculation module 4 may not use index locations from any prior timesteps and may create a heap of values for the current time step "from scratch." In some examples, tail calculation module 4 may bootstrap the tail calculation for the current timestep while also re-creating the heap of indices. For instance, if the heap of indices is re-created every ten timesteps, tail calculation module 4 may use the heap of indices determined during the tail calculation for the first timestep to populate the heap of values for the eleventh timestep, then perform corresponding operations on the heap of indices as tail calculation module 4 modifies the heap of values for the eleventh timestep.

In some examples, tail calculation module 4 may be multi-threaded and/or parallelized across a cluster (e.g., executed using distributed computing). That is, tail calculation module 4 may be operable by processors 30 to execute more than one thread and/or multiple instances of tail calculation module 4, each executing at a respective instance of computing system 2 may each execute one or more threads. In some examples, one or more instances of tail calculation module 4 may execute a plurality of threads in parallel. In some examples, one or more instances of tail calculation module 4 may execute threads one at a time. When executing multiple threads, each thread of tail calculation module 4 and/or each instance of tail calculation module 4 may perform tail calculations for different timesteps. For instance, a first thread and/or first instance of tail calculation module 4 may calculate tails for timesteps 1-10 by calculating the tail for timestep 1 using conventional means and bootstrapping the tail calculation for timesteps 2-10. A second thread and/or a second instance of tail calculation module 4 may calculate tails for timesteps 11-20 by calculating the tail for timestep 11 using conventional means and bootstrapping the tail calculation for timesteps 12-20. In such instance, 25 threads and/or 25 instances of tail calculation module 4 would be used to calculate tails for all 250 timesteps.

Tail calculation module 4 may provide the results of one or more of the tail calculations to one or more other components of computing system 2 for output. For example, tail calculation module 4 may provide a list of the tail calculation results to one or more of output devices 36 for display to a user. As another example, tail calculation module 4 may provide a list of the tail calculation results to communication units 32 for transmission to another computing device (e.g., via one or more wired or wireless networks).

Figure 3:
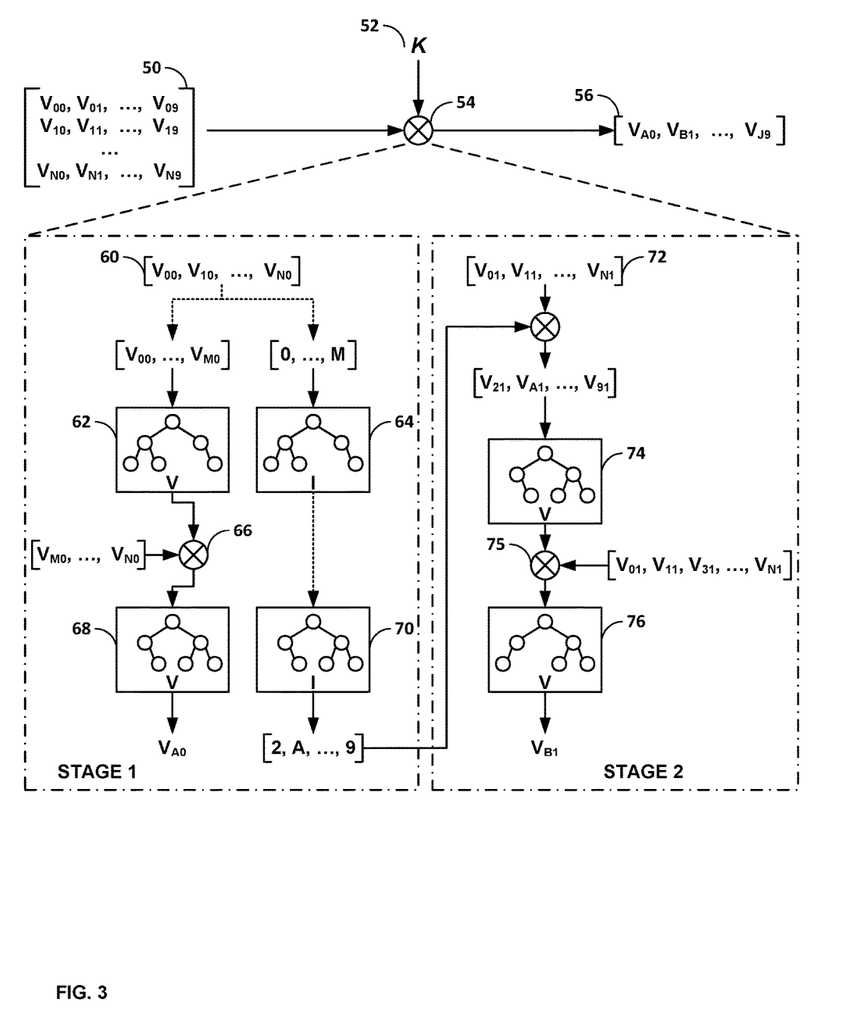
FIG. 3 is a conceptual diagram illustrating example operations for performing efficient tail calculations in accordance with one or more techniques of the present disclosure.

FIG. 3 is a conceptual diagram illustrating example operations for performing efficient tail calculations in accordance with one or more techniques of the present disclosure. The example of FIG. 3 is described below within the context of FIGS. 1 and 2. For instance, the operations described in FIG. 3 may be performed by tail calculation module 4 of computing system 2.

In the example of FIG. 3, datasheet 50 may represent as an S by T grid of values (e.g., a two-dimensional matrix) in which each row of the matrix corresponds to a simulated scenario (e.g., a dataset) and each column of the matrix corresponds to a timestep of the scenarios. In the example of FIG. 3, tail calculation module 4 is configured to receive datasheet 50 and threshold value k (e.g., threshold value 52) and perform right tail computations on each dataset in datasheet 50. That is, tail calculation module 4 may perform operation 54 on datasheet 50 and threshold value 52 to obtain right tail set 56. Operation 54, as shown in the example of FIG. 3, may be defined by the following pseudo-code:

for(i=0; i<number_of_timesteps; i++) result[i]=righttail(data[0 . . . number_of_scenarios, i], number_of_scenarios, k=threshold)

In the pseudo-code above, i represents the timestep. Number_of_scenarios represents how many different scenarios there are (e.g., how many possible realities). In the example of FIG. 3, there are N scenarios. Data[0, . . . , number_of_scenarios, i] represents all the scenario values for a timestep, i. For instance, data[0, . . . , N, 1] represents all N scenarios for timestep 1, and so on. Finally, k represents the threshold (e.g., the number of scenarios multiplied by the specified percentile). In the example of FIG. 3, tail calculation module 4 may perform operation 54 by performing STAGE 1 and STAGE 2 as described herein.

For ease of illustration, pseudo-code representing one possible conventional heap-based algorithm for calculating a right tail is presented below and annotated with the complexity associated with each step in "big O" notation

```
righttail(data, n, k) // data: an array of unsorted numbers, n: number
of elements, k: threshold
let m=n-k
allocate a heap of size m
copy elements 0...m into the heap // O(m)
make the heap into a min-heap (where each parent is smaller than
all its children) // O(m)
for i=m...n {
// rejection test, O((n-m)*log(m))
if (data[i]>heap[0]) {
// root of heap is smallest of the m biggest elements seen so far, so swap
replace root of heap with data[i] // O(log(m))
}
}
return heap[0]
```

In essence, this pseudo-code initially populates a heap with data[0, . . . , m], which results in an unsorted, or "uneducated" heap. The pseudo-code then loops over the remaining data[m, . . . , n] elements and performs a rejection test. In order to maintain the property of a min-heap, whereby the smallest value in the heap is the root of the heap, a replace-root operation must take place each time data[i]>heap[0].

In accordance with the techniques of the present disclosure, tail calculation module 4 may use a conventional method, such as the one described above, to perform an initial tail calculation as part of STAGE 1. However, tail calculation module 4 may also generate and maintain a heap of indices for use in STAGE 2. That is, as shown in the example of FIG. 3, tail calculation module 4 may execute the following pseudo-code to perform an initial tail calculation in accordance with the techniques described herein.

```
righttail(data, n, k)
let m=n-k
allocate two heaps of size m: v-heap and i-heap
copy data[0...m] into v-heap
write 0...m into i-heap
make v-heap into a min-heap while maintaining correspondence
in i-heap // O(m)
for i=m...n {
// rejection test, O((n-m)*log(m))
if (data[i]>v-heap[0]) {
// root of v-heap is smallest of the m biggest elements seen so far, so
swap
replace root of v-heap with data[i] // O(log(m))
replace root of i-heap with i // corresponding swap in i-heap
}
}
return v-heap[0] and all of i-heap
```

Tail calculation module 4 may perform this "first pass" to calculate the right tail of a first dataset in a plurality of sequential datasets (e.g., first dataset 60 from datasheet 50). In order to track the indices of the m largest values of first dataset 60 at the same time, tail calculation module 4 uses two heaps. One is a value heap, or v-heap, and the other is an index-heap, or i-heap. Similar to the default algorithm, tail calculation module 4 initially populates the v-heap with data[0, . . . , m] from first dataset 60. Tail calculation module 4 also populates the i-heap with indices 0, . . . , m. Tail calculation module 4 then performs a heapification process for the v-heap that is identical to the default algorithm to obtain v-heap 62 as shown in FIG. 3.

For each modification that tail calculation module 4 performs on the v-heap to obtain v-heap 62, tail calculation module 4 performs a corresponding modification on the i-heap to obtain i-heap 64 as shown in FIG. 3. In this way, tail calculation module 4 will ensure that the indices in i-heap 64 continue to correspond to the values in v-heap 62.

Tail calculation module 4 may then perform operation 66 to compare the remaining values of dataset 60 (e.g., data[m, . . . , n]) to the value of the root node of v-heap 62. If a particular value is larger than the root node value, tail calculation module 4 may replace the root of v-heap 62 with the particular value. In this way, tail calculation module 4 may obtain v-heap 68, representing the m largest values of dataset 60 and having the smallest of those values as a root node. The root node thus represents the tail of dataset 60. Tail calculation module 4 may therefore include the root node in tail set 56.

When replacing the root of v-heap 62 with the particular value, tail calculation module 4 may also replace the root of i-heap 64 with the index of the particular value. As a result, tail calculation module may obtain i-heap 70, representing the indices of the m largest values of dataset 60. This "bookkeeping" of the i-heap (e.g., maintaining the correspondence between the values in the v-heap and the indices in the i-heap) may introduce a small amount of delay in performing operation 54. However, such delay should be outweighed by the performance gain when using an educated heap in subsequent tail computations as described herein.

In STAGE 2 of operation 54, tail calculation module 4 may use the pseudo-code below to perform subsequent tail calculations in accordance with the techniques described herein.

```
righttail(data, n, k, i-heap)
let m=n-k
allocate v-heap
for each index, j, in i-heap, copy data[j] into v-heap // O(m)
make the v-heap into a min-heap // O(m)
make the i-heap into a min-heap // O(m)
for i=0...n {
// O(n*log(m))
if (i-heap[0]==i)
remove root of i-heap // O(log(m))
```

```
else if ( v-heap[0] < data[i] )
    replace root of v-heap with data[i]  // O(log(m))
else
    do nothing
}
```

This "second pass" of the algorithm makes use of the i-heap created from the initial tail calculation (e.g., STAGE 1) to create an educated v-heap for the current dataset. That is, in STAGE 2, tail calculation module 4 may use the indices of dataset 60 that are contained in i-heap 70 when performing the tail calculation for a subsequent dataset, such as dataset 72. Tail calculation module 4 may populate a v-heap for dataset 72 with data values located at indices of dataset 72 that are specified by i-heap 70. In the example of FIG. 3, for instance, tail calculation module 4 may populate the v-heap with the values of dataset 72 that are located at indices 2, A, . . . , and 9.

Tail calculation module 4 may then heapify the v-heap for dataset 72 into a min-heap to obtain v-heap 74. Tail calculation module 4 may also heapify i-heap 70 (not shown in FIG. 3). Heapifying i-heap 70 may enable tail calculation module 4 to "skip" values of dataset 72 that are already in v-heap 74 during the subsequent comparison phase. That is, as tail calculation module 4 iterates over each particular value of dataset 72, tail calculation module may first compare the root node of the heapified i-heap to the index for the particular value (e.g., does i-heap[0]==i). If the current index is the root of the heapified i-heap, then tail calculation module 4 may remove the root of the heapified i-heap and increments the index, as the corresponding value is or was already in v-heap 74. However, this condition should be false most of the time, because only m of the n possible indices are in the heapified i-heap.

If the index is not in the heapified i-heap, then tail calculation module 4 may perform operation 75 to determine whether the current data value for dataset 72 (e.g., data[i]) is larger than the root of v-heap 74 (e.g., v-heap[0]). That is, tail calculation module 4 may determine whether the current root of the v-heap is smaller than the current data value (e.g., whether v-heap[0]<data[i]). Because v-heap 74 was populated based on i-heap 70, this condition should also be false more often than if random values were used to initially populate the v-heap for dataset 72. That is, the rejection test of operation 75 should be able to successfully reject most of the attempts for replace-root operations, thereby substantially improving computational performance.

Tail calculation module 4 may iterate through all remaining values of dataset 72, performing replace root operations as needed, and thereby produce v-heap 76. V-heap 76 represents the m largest values of dataset 72 and has the smallest of those values as its root node. Thus, tail calculation module 4 may add the root node of v-heap 76 to tail set 56. In some examples, tail calculation module 4 may repeat STAGE 2 of operation 54 to obtain tails for each subsequent dataset in datasheet 50. In some examples, tail calculation module 4 may repeat STAGE 1 periodically in order to improve the accuracy of the indices used in STAGE 2.

Figure 4:
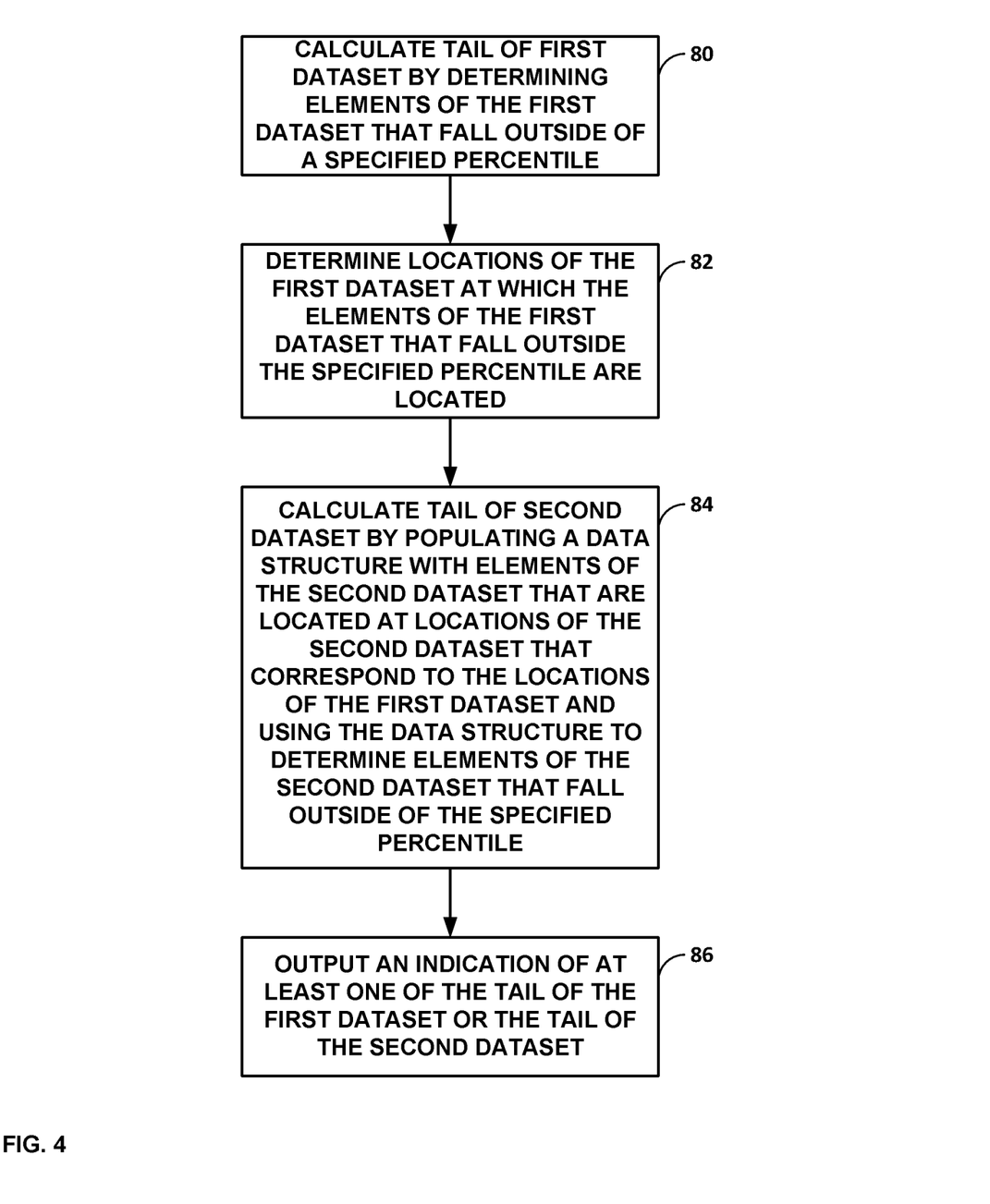
FIG. 4 is a flowchart illustrating example operations of a computing system for performing efficient tail calculations in accordance with one or more techniques of the present disclosure.

FIG. 4 is a flowchart illustrating example operations of a computing system for perform efficient tail calculations in accordance with one or more techniques of the present disclosure. For purposes of illustration only, the example operations of FIG. 4 are described below within the context of FIGS. 1 and 2. For instance, the example operations of FIG. 4 may be performed by tail calculation module 4 of computing system 2.

In the example of FIG. 4, computing system 2 may calculate a tail of a first dataset (80). Calculating the tail of the first dataset may include determining elements of the first dataset that fall outside of a specified percentile. For instance, in non-limiting examples, computing system 2 may calculate the tail of the first dataset by determining the largest value of the dataset that is smaller than 95% of the dataset values. Computing system 2 may determine locations of the first dataset at which the elements of the first dataset that fall outside of the specified percentile are located (82).

Computing system 2 may, in the example of FIG. 4, calculate a tail of a second dataset (84). In calculating the tail of the second dataset, computing system 2 may populate a data structure with elements of the second dataset that are located at locations of the second dataset that correspond to the locations of the first dataset, and determine, using the data structure, elements of the second dataset that fall outside of the specified percentile. In this way, computing device 2 may leverage the correlation of the first and second datasets to more efficiently and quickly determine the tail of the second dataset.

In the example of FIG. 4, computing system 2 may output an indication of at least one of the tail of the first dataset or the tail of the second dataset (86). For instance, computing system 2 may provide an indication of the tails of the datasets to a user and/or to another computing device.

In some examples, determining the elements of the second dataset that fall outside of the specified percentile includes, for each particular element in the second dataset other than the elements stored in the data structure: comparing the particular element with one or more elements in the data structure; and responsive to determining that the particular element is smaller than any element in the data structure, replacing a smallest element in the data structure with the particular element.

In some examples, the data structure comprises a first data structure, and determining the elements of the first dataset that fall outside of the specified percentile includes: determining, based on the specified percentile and a number of elements in the first dataset, a number, m, that indicates how many elements of the first dataset will fall outside of the specified percentile; storing, in a second data structure, m elements of the first dataset; and for each particular element in the first dataset other than the m elements stored in the second data structure: comparing the particular element with each element in the second data structure; and responsive to determining that the particular element is smaller than any element in the second data structure, replacing a smallest element in the second data structure with the particular element.

In some examples, the first dataset and the second dataset are both associated with a potential financial transaction, and the method further includes: determining, by the computing device and based at least in part on the tail of the second dataset, a value of a risk measure associated with the potential financial transaction, wherein outputting the indication of at least one of the tail of the first dataset or the tail of the second dataset comprises outputting, by the computing device and based at least in part on the value of the risk measure, a recommendation associated with the potential financial transaction. In some examples, the first dataset represents a first point in time for a Monte Carlo simulation, and the second dataset represents a second point in time for the Monte Carlo simulation, the second point in time following the first point in time in the Monte Carlo simulation.

In some examples, the first dataset and second dataset are each included in a plurality of sequential datasets, the second dataset occurs subsequent to the first dataset in the plurality of sequential datasets, the data structure comprises a first data structure, and the method further includes: calculating a tail of a third dataset from the plurality of sequential datasets without using locations of any datasets prior to the third dataset in the plurality of sequential datasets, wherein the third dataset occurs subsequent to the second dataset in the plurality of sequential datasets, and wherein calculating the tail of the third dataset includes determining elements of the third dataset that fall outside of the specified percentile; determining locations of the third dataset at which the elements of the third dataset that fall outside of the specified percentile are located; calculating a tail of a fourth dataset, wherein the fourth dataset occurs subsequent to the third dataset in the plurality of sequential datasets, and wherein calculating the tail of the fourth dataset includes: populating a second data structure with elements of the fourth dataset that are located at locations of the fourth dataset that correspond to the locations of the third dataset, and determining, using the second data structure, elements of the fourth dataset that fall outside of the specified percentile; and outputting an indication of at least one of the tail of the third dataset or the tail of the fourth dataset.

In some examples, the data structure comprises a heap-like data structure. In some examples, the data structure comprises a min-heap or a max-heap.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. A computer program product may include a computer-readable storage medium. By way of example, and not limitation, computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    calculating, by a computing device, a tail of a first dataset, wherein calculating the tail of the first dataset includes determining elements of the first dataset that fall outside of a specified percentile;
    determining, by the computing device, locations of the first dataset at which the elements of the first dataset that fall outside of the specified percentile are located;
    calculating, by the computing device, a tail of a second dataset, wherein calculating the tail of the second dataset includes:
        populating a data structure with elements of the second dataset that are located at locations of the second dataset that correspond to the locations of the first dataset, and
        determining, using the data structure, elements of the second dataset that fall outside of the specified percentile; and
    outputting, by the computing device, an indication of at least one of the tail of the first dataset or the tail of the second dataset.

2. The method of claim 1, wherein determining the elements of the second dataset that fall outside of the specified percentile comprises:
    for each particular element in the second dataset other than the elements stored in the data structure:
        comparing the particular element with one or more elements in the data structure; and
        responsive to determining that the particular element is smaller than any element in the data structure, replacing a smallest element in the data structure with the particular element.

3. The method of claim 1, wherein the data structure comprises a first data structure, and wherein determining the elements of the first dataset that fall outside of the specified percentile comprises:
    determining, based on the specified percentile and a number of elements in the first dataset, a number, m, that indicates how many elements of the first dataset will fall outside of the specified percentile;
    storing, in a second data structure, m elements of the first dataset; and
    for each particular element in the first dataset other than the m elements stored in the second data structure:
        comparing the particular element with each element in the second data structure; and
        responsive to determining that the particular element is smaller than any element in the second data structure, replacing a smallest element in the second data structure with the particular element.

4. The method of claim 1, wherein the first dataset and the second dataset are both associated with a potential financial transaction, the method further comprising:

determining, by the computing device and based at least in part on the tail of the second dataset, a value of a risk measure associated with the potential financial transaction, wherein outputting the indication of at least one of the tail of the first dataset or the tail of the second dataset comprises outputting, by the computing device and based at least in part on the value of the risk measure, a recommendation associated with the potential financial transaction.

5. The method of claim 1, wherein the first dataset represents a first point in time for a Monte Carlo simulation, and wherein the second dataset represents a second point in time for the Monte Carlo simulation, the second point in time following the first point in time in the Monte Carlo simulation.

6. The method of claim 1, wherein the first dataset and second dataset are each included in a plurality of sequential datasets, wherein the second dataset occurs subsequent to the first dataset in the plurality of sequential datasets, and wherein the data structure comprises a first data structure, the method further comprising:

calculating a tail of a third dataset from the plurality of sequential datasets without using locations of any datasets prior to the third dataset in the plurality of sequential datasets, wherein the third dataset occurs subsequent to the second dataset in the plurality of sequential datasets, and wherein calculating the tail of the third dataset includes determining elements of the third dataset that fall outside of the specified percentile;

determining locations of the third dataset at which the elements of the third dataset that fall outside of the specified percentile are located;

calculating a tail of a fourth dataset, wherein the fourth dataset occurs subsequent to the third dataset in the plurality of sequential datasets, and wherein calculating the tail of the fourth dataset includes:

populating a second data structure with elements of the fourth dataset that are located at locations of the fourth dataset that correspond to the locations of the third dataset, and determining, using the second data structure, elements of the fourth dataset that fall outside of the specified percentile; and outputting an indication of at least one of the tail of the third dataset or the tail of the fourth dataset.

7. The method of claim 1, wherein the data structure comprises a heap-like data structure.

8. The method of claim 1, wherein the data structure comprises a min-heap or a max-heap.

* * * * *